United States Patent
Tanaka

(10) Patent No.: US 8,103,413 B2
(45) Date of Patent: Jan. 24, 2012

(54) COMMUNICATIONS NETWORK OF PASSENGER PROTECTION SYSTEM

(75) Inventor: Tatsuki Tanaka, Nagoya (JP)

(73) Assignee: Denso Corporation, Kariya (JP)

( * ) Notice: Subject to any disclaimer, the term of this patent is extended or adjusted under 35 U.S.C. 154(b) by 322 days.

(21) Appl. No.: 12/590,615

(22) Filed: Nov. 10, 2009

(65) Prior Publication Data
US 2010/0121537 A1    May 13, 2010

(30) Foreign Application Priority Data
Nov. 12, 2008  (JP) ................... 2008-290342

(51) Int. Cl.
*B60R 22/00* (2006.01)

(52) U.S. Cl. .......................... 701/45; 280/735

(58) Field of Classification Search ............ 701/45, 701/47; 280/735
See application file for complete search history.

(56) References Cited

U.S. PATENT DOCUMENTS

| 5,964,815 A | 10/1999 | Wallace et al. |
| 7,539,804 B2 | 5/2009 | Miura |
| 7,887,089 B2* | 2/2011 | Breed et al. ............ 280/735 |
| 2005/0171673 A1* | 8/2005 | Miura ....................... 701/70 |
| 2007/0032933 A1* | 2/2007 | Glaser ...................... 701/45 |

FOREIGN PATENT DOCUMENTS

| JP | 05-037535 | 2/1993 |
| JP | 2005-045567 | 2/2005 |
| JP | 2007-215102 | 8/2007 |

* cited by examiner

*Primary Examiner* — Isam Alsomiri
(74) *Attorney, Agent, or Firm* — Harness, Dickey & Pierce, PLC

(57) ABSTRACT

An electronic control unit charges capacitors of sensors to produce idle phase waveforms having different waveform parameters assigned to the sensors, and transmits nothing between the signal phase time periods. Each sensor detects the idle phase waveform parameter of the capacitor. The sensor responds to the ECU during the signal phase time period, if the detected parameter corresponds to predetermined waveform parameter.

7 Claims, 9 Drawing Sheets

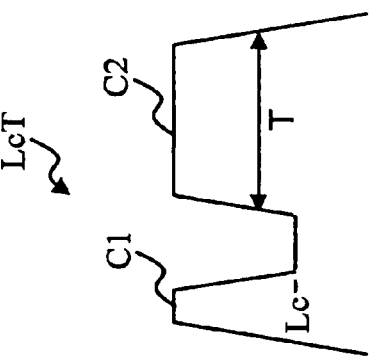
FIG. 8A
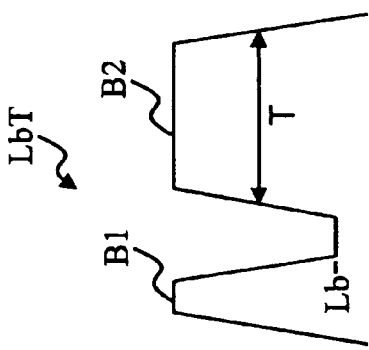
FIG. 8B
FIG. 8C
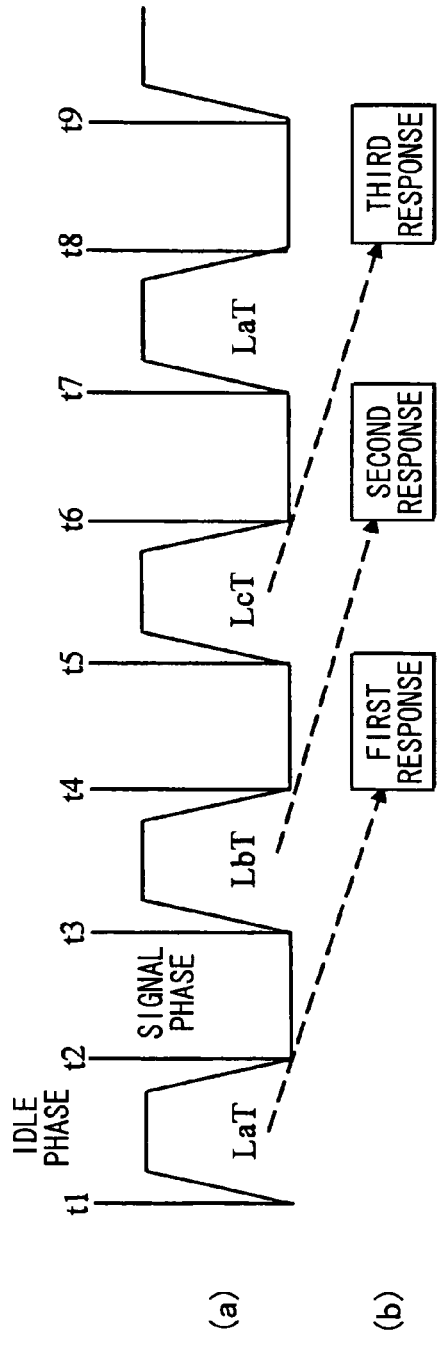
FIG. 9

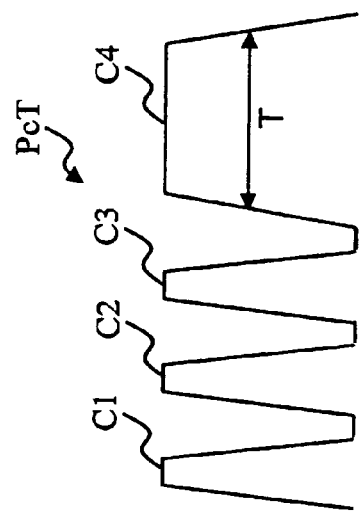
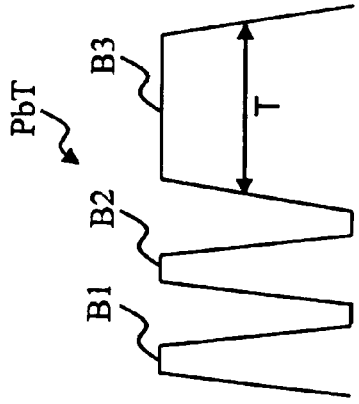
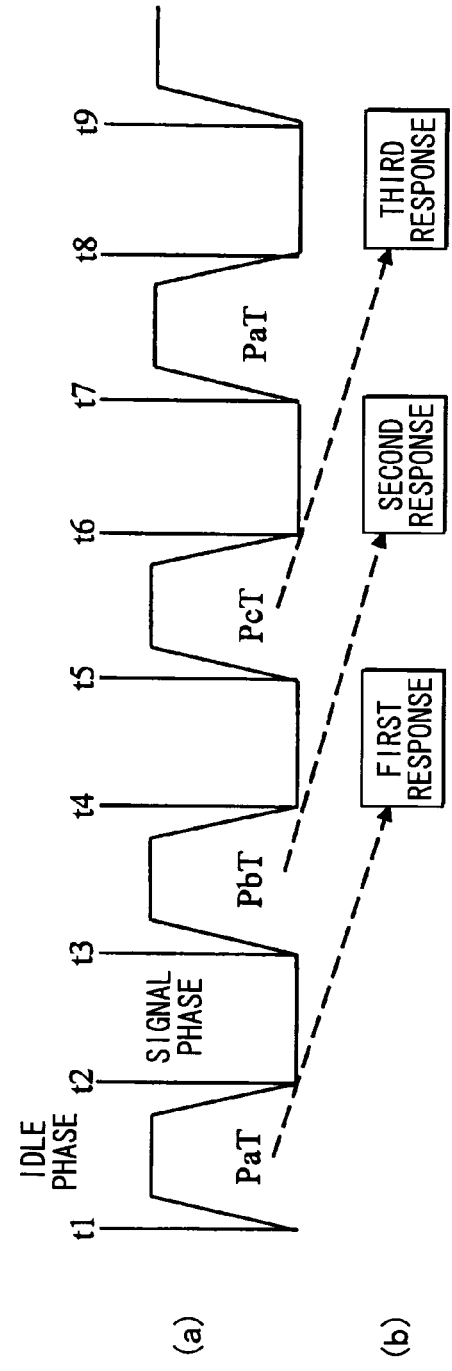

COMMUNICATIONS NETWORK OF PASSENGER PROTECTION SYSTEM

CROSS REFERENCE TO RELATED APPLICATION

This application is based on and incorporates herein by reference Japanese Patent Application No. 2008-290342 filed on Nov. 12, 2008.

FIELD OF THE INVENTION

The present invention relates to a communications network of a passenger protection system, which has an electronic control unit (ECU) and a plurality of sensors. The ECU is equipped in a passenger protection device such as an airbag for protecting passengers at time of collision of vehicles. The sensors are connected to the ECU and detect travel speed of a vehicle or collision.

BACKGROUND OF THE INVENTION

Various passenger protection devices such as an airbag and a seatbelt pretensioner are equipped in vehicles recently. The passenger protection system including such a passenger protection device includes, as shown in FIG. 1, front sensors 11a, 11b mounted at both front left and right sides of a vehicle 10, safety sensors 13a, 13b mounted at a front or rear passenger seats in a passenger compartment, and a plurality of sensors (first to third sensors) 15a to 15c, 16a to 16c mounted at both left and right sides of the vehicle 10. These sensors are connected to an electronic control unit (ECU) 18, thus forming a communications network. Each of the sensors 11a, 11b, 13a to 13c, 15a to 15c, 16a to 16c detects travel speed or collision of the vehicle, and the ECU 18 activates airbags (not shown) based on the detected travel speed or collision.

In this communications network, the sensors 15a to 15c, 16a to 16c have respective switches in the inside parts and connected to the ECU 18 through buses. These switches are closed sequentially by initialization of setting addresses from the sensor closest to the ECU 18, when electric power is supplied in the vehicle 10. Specifically, the switch of the first sensor 15a, which is closest to the ECU 18, is set with its address and closed to connect the second sensor 15b to the ECU 18. After setting an address to the sensor 15b by the ECU 18, the switch of the sensor 15b is closed to connect the sensor 15c as the third sensor to the ECU 18. The initialization is performed in this order.

In the communications between the ECU 18 and each sensor 15a to 15c, 16a to 16c, voltage communications is performed from the ECU 18 to each sensor 15a to 15c, 16a to 16c and current communications is performed from each sensor 15a to 15c, 16a to 16c to the ECU 18.

In the voltage communications, for example, "0" and "1" are used. "0" is an amplitude signal, if one-third ($\frac{1}{3}$) is 0 volt (V) and two-thirds ($\frac{2}{3}$) is 5 V with respect to the duty. "1" is an amplitude signal, if one-third ($\frac{1}{3}$) is 5 V and two-thirds ($\frac{2}{3}$) is 0 V with respect to the duty. Here, the duty is the ratio of time of 5V relative to one cycle time of the signal.

In the current communications, for example, "0" and "1" are used as well. However, "0" is a current signal of 0 milliamperes (mA) and "1" is a current signal of 10 mA.

It is assumed that the sensors 15a to 15c and the ECU 18 are bus-connected to each other through a power-side line 21 and a ground-side line 22 in series or in sequence as shown in FIG. 2. The sensors 15a to 15c have respective capacitors 24a to 24c at sides of the ECU 18 (input sides), and switches 26a to 26c to connect to the sensor of the following stage.

The voltage communications from the ECU 18 to each sensor 15a to 15c is indicated by (a) and the current communications from each sensor 15a to 15c to the ECU 18 is indicated by (b) in FIG. 3.

It is first assumed that the switches 26a to 26c of the sensors 15a to 15c are all in the off-state. It is also assumed that the capacitor 24a of the first sensor 15a is charged in response to a first charge command of the ECU 18 in the idle phase before time t1. In the following signal phase from time t1 to time t2, the ECU 18 transmits to the first sensor 15a a first command to set a first address by the voltage communications. The first sensor 15a closes its switch 26a after receiving the first command and setting the first address, so that the second sensor 15b is connected to the ECU 18 therethrough.

The ECU 18 transmits a second charge command in the following idle phase from time t2 to time t3. The capacitor 24b of the second sensor 15b is charged in response to the second charge command. In the signal phase from time t3 to time t4, the first sensor 15a transmits to the ECU 18 a first response, which indicates completion of setting of the first address. The ECU 18 transmits a second command of second address setting to the second sensor 15b by the voltage communications. The second sensor 15b closes its switch 26b after receiving the second command and setting the second address, so that the third sensor 15c is further connected to the ECU 18 therethrough. After receiving the first response from the first sensor 15a, the ECU 18 performs communications with the first sensor 15a by using the first address, which is included in the first response from the first sensor 15a.

When the ECU 18 transmits a third charge command in the following idle phase from time t4 to t5, the capacitor 24c of the third sensor 15c is charged. In the signal phase from time t5 to time t6, the second sensor 15b transmits to the ECU 18 a second response, which indicates completion of setting the second address. The ECU 18 transmits a command of third address setting to the third sensor 15c by the voltage communications. The third sensor 15b sets its address after receiving the third command. After receiving the second response from the second sensor 15b, the ECU 18 performs communications with the second sensor 15b by using the second address, which is included in the second response from the second sensor 15b.

In the similar manner, the capacitor 24c of the third sensor 15c is charged in the idle phase from time t6 to time t7. Then the third sensor 15c transmits to the ECU 18 a third response, which indicates completion of setting the third address, in the next signal phase from time t7 to time t8.

JP 2007-215102A (U.S. Pat. No. 7,539,804) also discloses a conventional communications network, in which an ECU communicates with sensors by setting respective addresses in the similar manner as described above. According to the conventional communications networks, the ECU communicates with the sensors at communications speed of 150 to 200 kbps in the signal phase. In this instance, higher harmonics (noises) of frequencies corresponding to several times of the communications speed are generated, thus adversely affecting AM (amplitude modulation) radio frequency band of 510 kHz to 1710 kHz. Increased cost is necessitated to reduce such noises.

SUMMARY OF THE INVENTION

It is therefore an object of the present invention to provide a communications network of a passenger protection system, which can perform communications between an electronic control unit and a plurality of sensors without adversely affecting an AM radio band nor requiring noise-countering, additional costs.

According to the present invention, a communications network of a passenger protection system having a passenger protection device, which protects passengers at time of vehicle collision, includes a plurality of sensors and an electronic control unit. The sensors include respective capacitors, which are electrically chargeable. The electronic control unit is configured to control the passenger protection device and is bus-connected to the sensors to control charging of the capacitors so that the sensors respond by electric charge of the capacitors. The electronic control unit is configured to control initialization of the sensors by controlling a state, in which an idle phase time period for charging the capacitors and a signal phase time period for receiving responses of the sensors are alternately repeated. The electronic control unit includes a first memory circuit for storing a plurality of waveform generation data provided in correspondence to the sensors differently one another so that the capacitors produce idle phase waveforms corresponding to the stored waveform generation data, and a communications control circuit for controlling respective charging of the sensors in the idle phase time period in accordance with the stored waveform generation data. Each of the sensors includes a second memory circuit for storing a parameter data corresponding to the stored waveform generation data provided thereto, a detection circuit for detecting a parameter data of the idle phase waveform of the capacitor, and a response circuit for responding to the electronic control unit in the signal phase time period when the detected parameter data of the idle phase waveform corresponds to the stored parameter data of the idle phase waveform.

Both the waveform generation data and the parameter data include either one of a charge time period, an inter-peak level and a peak number of each idle phase waveform produced by the capacitor in the idle phase time period.

BRIEF DESCRIPTION OF THE DRAWINGS

The above and other objects, features and advantages of the present invention will become more apparent from the following detailed description made with reference to the accompanying drawings. In the drawings:

FIGS. 8A to 8C are waveform diagrams showing idle phase waveforms having respective inter-peak waveform levels in the communications network of the passenger protection system according to the second embodiment;

FIG. 9 is a timing diagram showing signal waveforms at time of communications between an ECU and a plurality of sensors of the communications network of the passenger protection system according to the second embodiment;

FIGS. 11A to 11C are waveform diagrams showing idle phase waveforms having respective number of peaks in the communications network of the passenger protection system according to the third embodiment;

FIG. 12 is a timing diagram showing signal waveforms at time of communications between an ECU and a plurality of sensors of the communications network of the passenger protection system according to the third embodiment;

DETAILED DESCRIPTION OF THE PREFERRED EMBODIMENT

The present invention will be described in detail with reference to various embodiments, in which the same or similar parts are designated by the same or, similar parts and the same or similar description thereof is omitted for brevity.

First Embodiment

Figure 1:
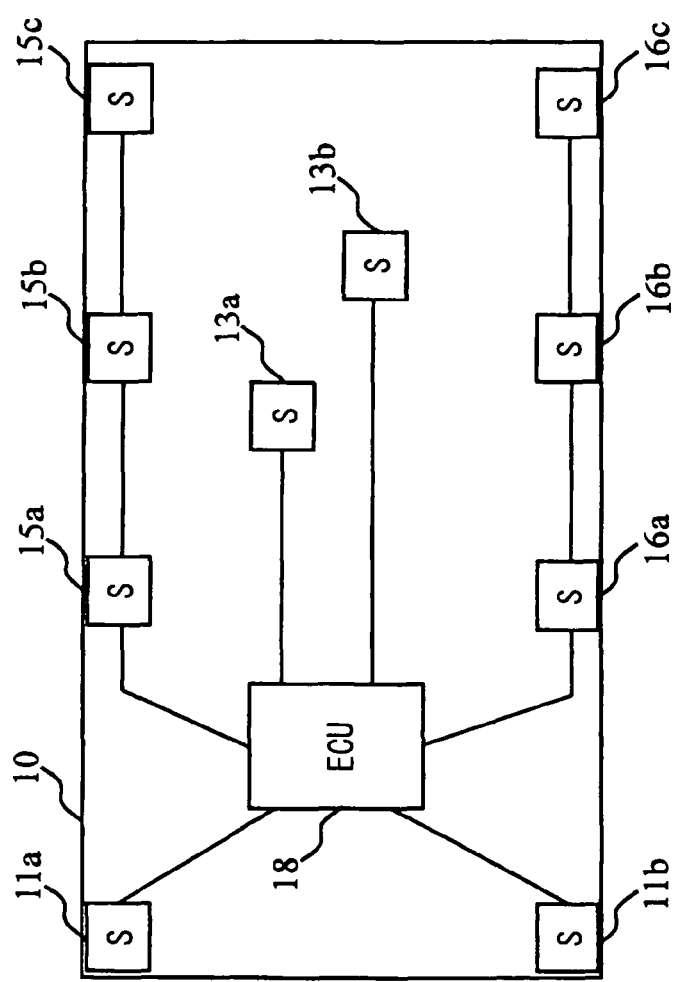
FIG. 1 is a schematic diagram showing an ECU and a plurality of sensors of a communications network of a conventional passenger protection system in a vehicle.
Figure 2:
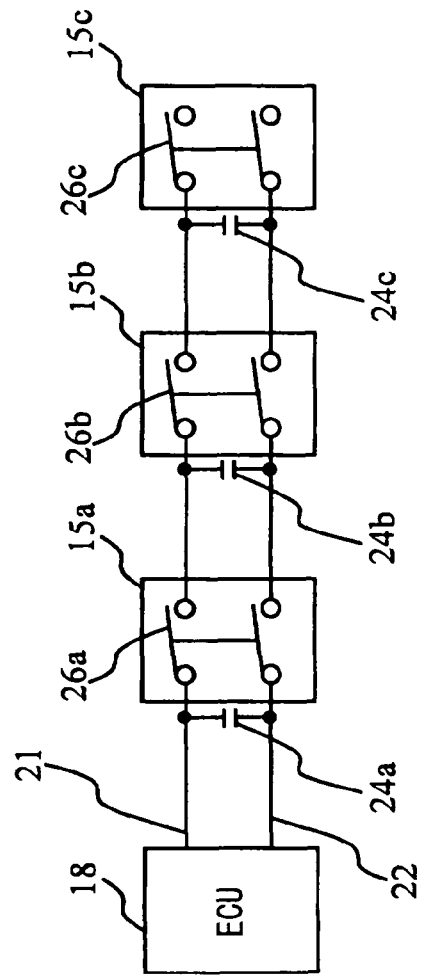
FIG. 2 is a schematic diagram showing the ECU and bus-connected sensors of the communications network of the conventional passenger protection system in a vehicle.
Figure 3:
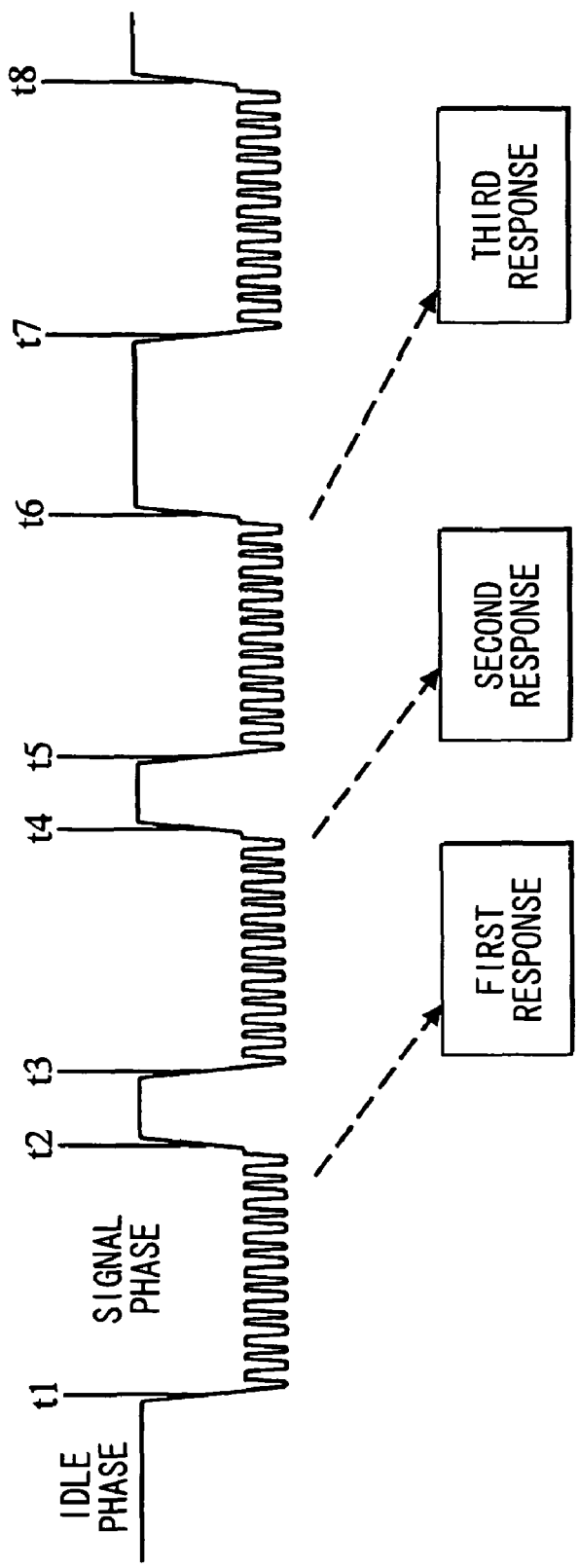
FIG. 3 is a timing diagram showing signal waveforms at time of communications between the ECU and each sensor of the communications network in the conventional passenger protection system.
Figure 4:
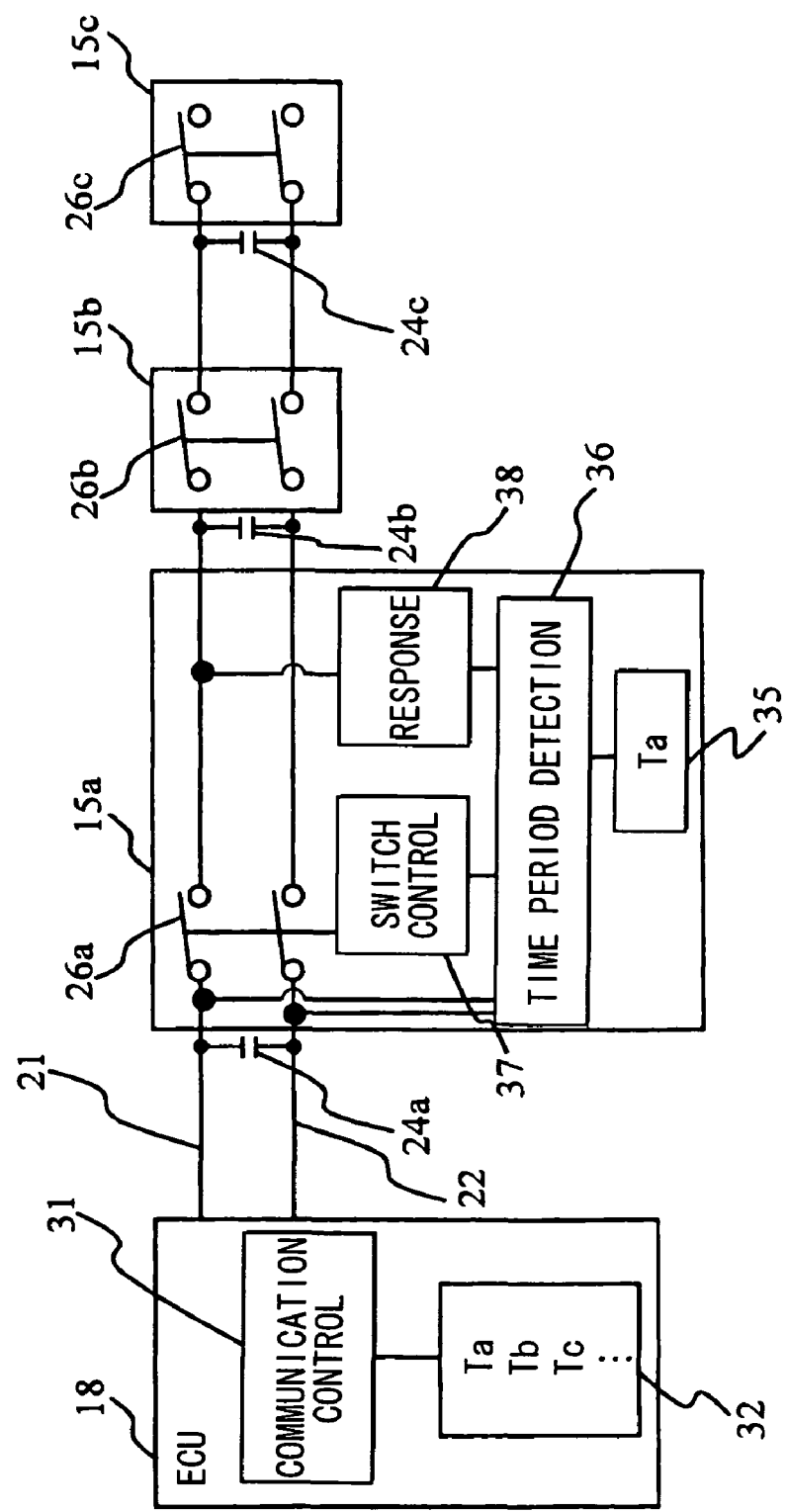
FIG. 4 is a block diagram showing a communications network of a passenger protection system according to a first embodiment of the present invention.

Referring to FIG. 4, a communications network of a passenger protection system is configured generally in the similar manner as the conventional communications network shown in FIG. 1. In FIG. 4, however, only a plurality of sensors 15a to 15c, which are mounted as series-connected first to third sensors at the right side of a vehicle 10, are shown as being bus-connected to an ECU 18.

The ECU 18 includes a communications control circuit 31 and a first memory circuit 32. The first sensor 15a includes a second memory circuit 35, a time period detection circuit 36, a switch control circuit 37 and a response circuit 38. The second sensor 15b and the third sensor 15c are also configured in the same manner as the first sensor 15a.

The memory circuits 32 of the sensors 15a to 15c store therein respective idle phase time periods Ta, Tb, Tc, which are set to be different one another. The idle phase time periods Ta, Tb, Tc are also referred to as a first sensor time period, a second sensor time period, a third sensor time period, respectively, as waveform generation data of each sensor 15a to 15c.

Figure 5:
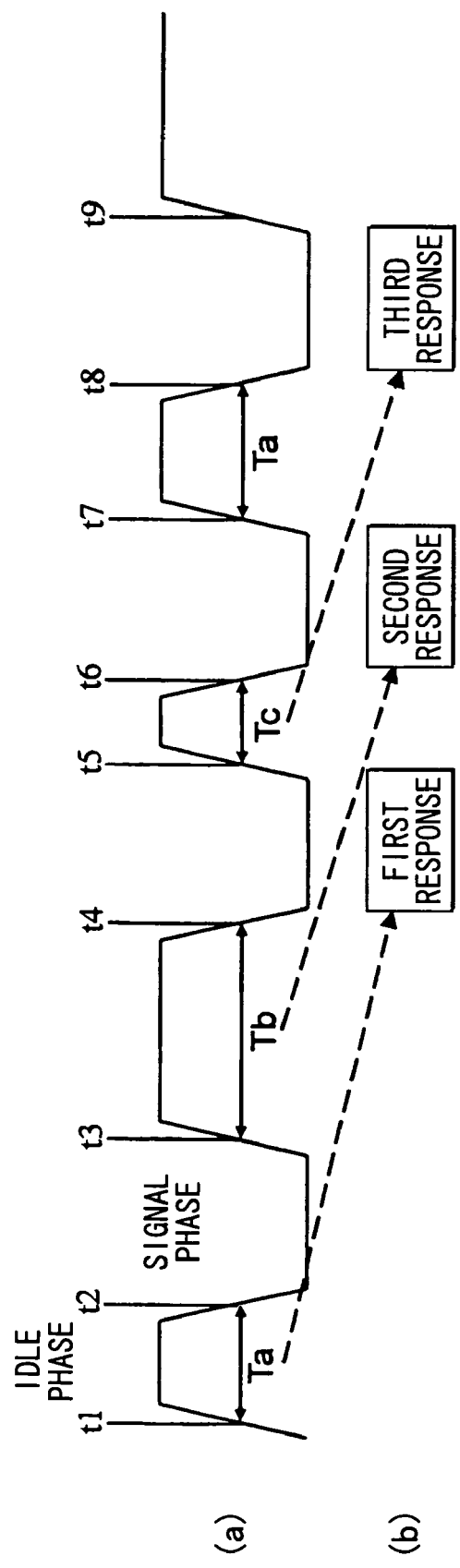
FIG. 5 is a timing diagram showing signal waveforms at time of communications between an ECU and a plurality of sensors of the communications network of the passenger protection system according to the first embodiment.

The communications control circuit 31 of the ECU 18 is configured to control communications with the sensors 15a to 15c by charging capacitors 24a to 24c of the sensors 15a to 15c during respective idle phase time periods Ta to Tc as indicated by (a) in FIG. 5. The communications control circuit 31 however transmits nothing during each signal phase between two of the idle phase time periods Ta to Tc. The capacitors 24a to 24c are charged to supply electric power for communications of the sensors 15a to 15c.

The memory circuit 32 of the ECU 18 stores therein the idle phase time periods Ta to Tc of the sensors 15a to 15c. The idle phase time periods Ta to Tc are parameter data of the charge voltage waveform of the capacitors 24a to 24c and correspond to the waveform generation data stored in the first memory circuit 32.

The time period detection circuit 36 of the first sensor 15a detects, as a parameter detection circuit, the idle phase time period from the charge period of the capacitor 24a and checks whether the detected time period corresponds to the idle phase time period Ta pre-stored in the memory circuit 35. The detection circuit 36 outputs a check result to the switch control circuit 37 and the response circuit 38.

Figure 6:
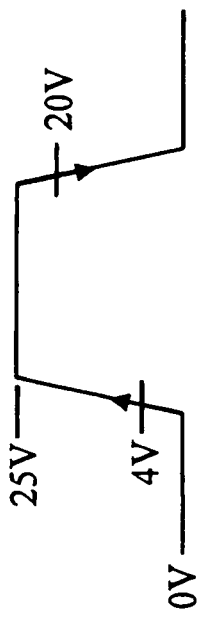
FIG. 6 is a waveform diagram showing detection of an idle phase time period by a time period detection circuit of the sensor in the communications network of the passenger protection system according to the first embodiment.

In detecting the idle phase time period, as shown in FIG. 6, the time period detection circuit 36 starts measuring the time period at time the charge voltage of the capacitor 24a developed by charging the capacitor 24a rises from 0 V to a predetermined threshold level, for example 4 V. The detection circuit 36 stops measuring the time period at time the charge voltage falls below a predetermined threshold level, for example 20 V, after reaching an upper limit level 25 V, respectively. The time period from starting to stopping the measurement is detected as the idle phase time period.

The switch control circuit 37 closes the switch 26a thereby to connect the second sensor 15b to the ECU 18, when the check result of the detection circuit 36 indicates that the detected time period corresponds to the idle phase time period Ta. When the check result of the detection circuit 36 indicates that the detected time period does not correspond to the idle phase time period Ta, the switch control circuit 37 does not close the switch 26a.

When the check result of the detection circuit 36 indicates that the detected time period corresponds to the idle phase time period Ta, the response circuit 38 transmits a first response to the ECU 18 as shown in FIG. 5. This first response is transmitted in the signal phase period (time t4 to time t5), which follows the idle phase time period Tb subsequent to the check operation (time t2 to time t3). The first response indicates that the idle phase time period Ta for the first sensor 15a has been received.

The ECU 18 thus recognizes the completion of initialization of the first sensor 15a by receiving the first response. The initialization of the first sensor 15a may be a turn-on of the first switch 26a in the first sensor 15a.

The initialization of the sensors 15a to 15c is performed in the communications network of the passenger protection system in the following manner, when electric power is supplied in the vehicle 10.

When the power supply is started in the vehicle 10, the communications control circuit 31 of the ECU 18 controls the first sensor 15a to charge the capacitor 24a during the idle phase time period Ta stored in the memory circuit 32 as a first sensor time period Ta. That is, the capacitor 24a is charged during the first sensor time period Ta from time t1 to time t2 as shown in FIG. 5.

In the first sensor 15a, in the idle phase time period (time t2 to t3), the time period detection circuit 36 measures the time period, in which the capacitor 24a is charged, to detect the idle phase time period. The detection circuit 36 further checks whether the detected time period substantially equals the idle phase time period Ta stored in the memory circuit 35. If the check result indicates that both time periods correspond to each other, this check result is applied to the switch control circuit 37 and the response circuit 38.

The switch control circuit 37 responsively closes the switch 26a thereby to connect the second sensor 15b to the ECU 18. The response circuit 38 transmits to the ECU 18 the first response, which indicates that the idle phase time period Ta has been received. This first response is transmitted in the signal phase time period, that is, from time t4 to time t5, which follows the idle phase time period Tb provided for the second sensor 15b subsequent to the preceding idle phase time period Ta for the first sensor 15a. The ECU 18 does not transmit any signals in this signal phase time period. The communications control circuit 31 of the ECU 18 thus recognizes the completion of initialization of the sensor 15a upon receiving the first response.

In the similar manner, in the second sensor 15b, the idle phase time period Tb, which is from time t3 to time t4, is detected and the switch 26b is closed to connect the third sensor 15c to the ECU 18. In the signal phase time period Tc from time t6 to time t7, the second response is transmitted from the second sensor to the ECU 18. Further, in the third sensor 15b, the idle phase time period Tc, which is from time t5 to time t6, is detected and the switch 26c is closed. In the signal phase time period, from time t8 to time t9, the third response is transmitted from the third sensor to the ECU 18. The communications control circuit 31 of the ECU 18 recognizes the completion of initialization of the sensors 15b and 15c upon receiving the second and third responses.

The sensors 15a to 15c may be connected in sequence without the switches 26a to 26c and the switch control circuits 37.

According to the first embodiment described above, the sensors 15a to 15c are provided with respective capacitor charge time periods as the idle phase time periods Ta to Tc, which are different from one another. The ECU 18 performs the capacitor charge control for the capacitors 26a to 26c during the idle phase time periods Ta to Tc and does not perform any signal transmission during the signal phase time periods.

In the sensors 15a to 15c, the idle phase time periods T are detected by measuring the charge time periods of the capacitors 26a to 26c. If the detected idle phase time T periods correspond to the stored idle phase time periods Ta to Tc, the response signals are transmitted to the ECU 18 during the signal phase time periods. The ECU 18 thus recognizes each sensor by receiving the corresponding response.

The ECU 18 thus does not transmit any signals in the signal phases in controlling the initialization of the sensors 15a to 15c, and hence the ECU 18 can specify each sensor 15a to 15c by receiving the response in the signal phases.

As a result, it is restricted that higher harmonics (noises) of frequencies corresponding to several times of the communications speed are generated, thus adversely affecting the AM radio frequency band. Further, no increased cost is necessitated to counter such noises. That is, the communications from the ECU 18 to the sensors 15a to 15c does not adversely affect the AM radio frequency band nor increase costs.

Second Embodiment

Figure 7:
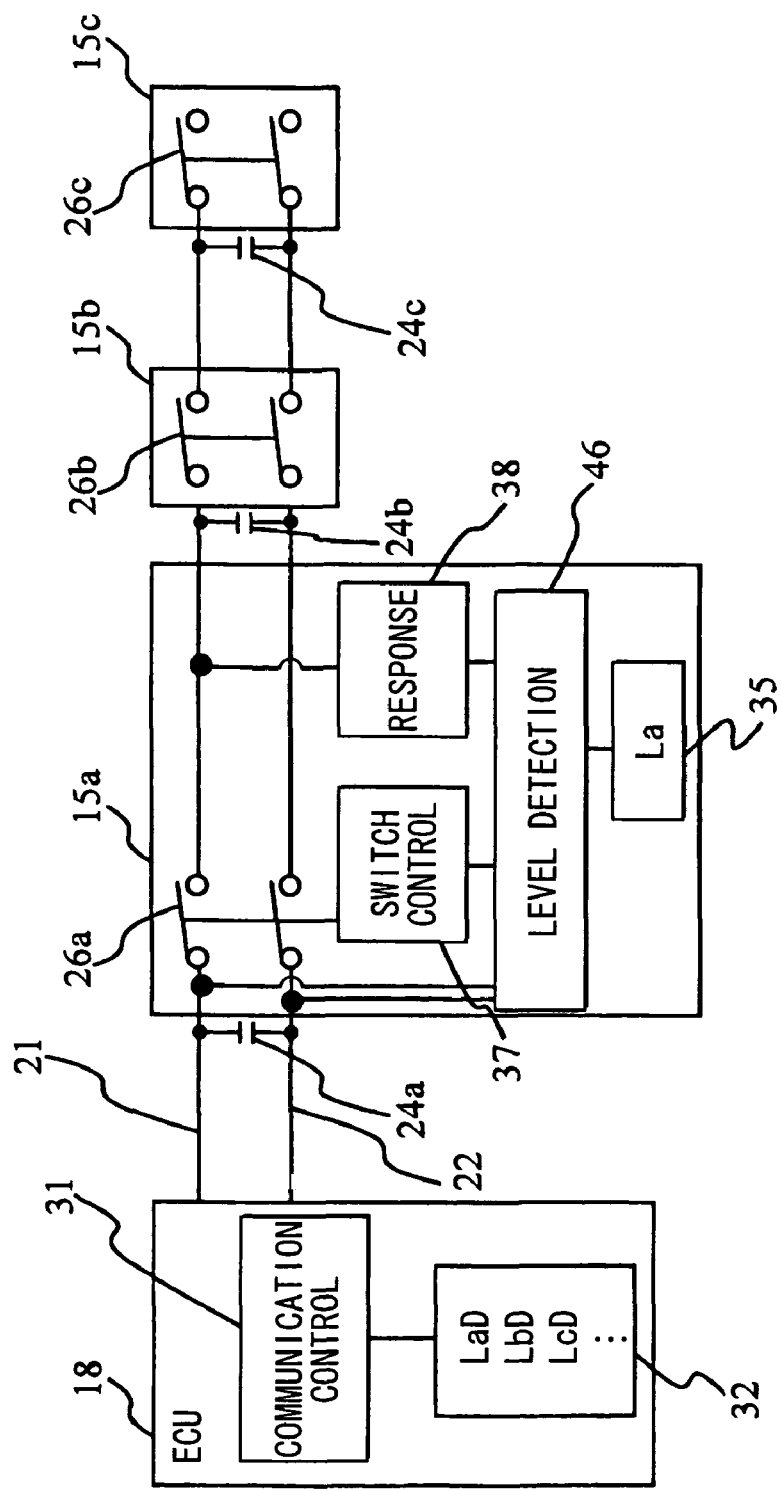
FIG. 7 is a block diagram showing a communications network of a passenger protection system according to a second embodiment of the present invention.

According to a second embodiment, as shown in FIG. 7, each sensor 15a to 15c includes a level detection circuit 46 as a parameter detection circuit in place of the time period detection circuit 36 of the first embodiment. Further, the memory circuit 32 of the ECU 18 stores predetermined idle phase waveform generation data LaD to LcD in place of the time periods Ta to Tc of the first embodiment.

The idle phase waveform generation data LaD, LbD, LcD are provided to generate idle phase waveforms LaT, LbT, LcT for the sensors 15a, 15b, 15c as shown in FIGS. 8A, 8B, 8C, respectively. The idle phase waveforms LaT to LcT have inter-peak voltage levels La to Lc, which are different one another. The levels La, Lb, Lc are provided as parameter data and present between two peaks A1 and A2, between two peaks B1 and B2, between two peaks C1 and C2.

The idle phase waveforms LaT to LcT are charge voltage waveforms of the capacitors 24a to 24c of the sensors 15a to 15c, respectively. Each capacitor 24a to 24c is effectively charged during the time period T in the second peak waveform A2 to C2 in each waveform cycle. Each idle phase waveforms LaT to LcT is shown in FIG. 9 in a simplified waveform having only one peak.

The communications control circuit 31 is configured to charge the capacitors 24a to 24c in accordance with the idle phase waveform generation data LaD to LcD stored in the memory circuit 32 so that the capacitors 24a to 24c generate the idle phase waveforms LaT to La, respectively, in the time sequence as shown in FIG. 9. The communications control circuit 31 transmits no signals during the signal phase time period as in the first embodiment.

The memory circuits 35 of the sensors 15a to 15c store predetermined inter-peak levels La to Lc as parameter data of the waveforms and different from one another, respectively, in place of the time periods Ta to Tc of the first embodiment.

The level detection circuit 46 is configured as the parameter detection circuit to detect the inter-peak level La from the idle phase waveform LaT, which is developed when the capacitor 24a is charged. The level detection circuit 46 further checks whether the detected inter-peak level La corresponds to its level stored in the memory circuit 35, and outputs its check result to the switch control circuit 37 and the response circuit 38.

The switch control circuit 37 closes the switch 26a of the first sensor 15a to connect the second sensor 15b to the ECU 18, when the check result of the waveform level detection circuit 46 indicates that the detected level corresponds to the stored level La. The switch control circuit 37 does not close the switch 26a, when the check result indicates no correspondence.

When the check result of the detection circuit 36 indicates that the detected level corresponds to the stored level La, the response circuit 38 transmits a first response to the ECU 18 as shown in FIG. 9. This first response is transmitted in the signal phase period (time t4 to time t5), which follows the idle phase time period subsequent to the check operation (time t2 to time t3). The first response indicates that the waveform level. La for the first sensor 15a has been received.

The communications control circuit 31 of the ECU 18 thus recognizes the completion of initialization of the first sensor 15a by receiving the first response.

The initialization of the sensors 15a to 15c is performed in the communications network of the passenger protection system in the following manner, when electric power is supplied in the vehicle 10.

When the power supply is started in the vehicle 10, the communications control circuit 31 of the ECU 18 controls the first sensor 15a to charge the capacitor 24a by the idle phase waveform generation data LaD stored in the memory circuit 32. That is, the capacitor 24a is charged during the idle phase time period from time t1 to time t2 shown in FIG. 9 in the waveform of FIG. 8A.

In the first sensor 15a, in the signal phase period (from time t2 to time t3), the waveform level detection circuit 36 detects the inter-peak waveform level La from the idle phase waveform LaT produced when the capacitor 24a is charged. The detection circuit 36 further checks whether the detected level is the same as the inter-peak waveform level La stored in the memory circuit 35. If the check result indicates that both levels correspond to each other, this check result is applied to the switch control circuit 37 and the response circuit 38.

The switch control circuit 37 responsively closes the switch 26a thereby to connect the second sensor 15b to the ECU 18. The response circuit 38 transmits to the ECU 18 the first response, which indicates that the inter-peak waveform level La for the first sensor 15a has been received. This first response is transmitted in the signal phase time period, that is, from time t4 to time t5, which follows the idle phase time period provided for the second sensor 15b subsequent to the preceding idle phase period for the first sensor 15a. The communications control circuit 31 of the ECU 18 recognizes the completion of initialization of the sensor 15a upon receiving the first response.

In the similar manner, in the second sensor 15b, the waveform level Lb produced in the idle phase time period from time t3 to time t4 is detected in the time period from time t3 to time t4 and the switch 26b is closed to connect the third sensor 15c to the ECU 18. In the signal phase time period from time t6 to time t7, the second response is transmitted from the second sensor 15b to the ECU 18. Further, in the third sensor 15b, the waveform level Lc is detected in the time period from time t5 to time t6, and the switch 26c is closed. In the signal phase time period from time t8 to time t9, the third response is transmitted from the third sensor 15c to the ECU 18. The communications control circuit 31 of the ECU 18 recognizes the completion of initialization of the sensors 15b and 15c upon receiving the second and third responses, respectively.

The sensors 15a to 15c may be connected in series without the switches 26a to 26c and the switch control circuits 37.

According to the second embodiment described above, the sensors 15a to 15c are provided with respective inter-peak waveform levels La to Lc, which are different from one another. The ECU 18 performs the capacitor charge control for the capacitors 26a to 26c in accordance with the idle phase waveform generation data LaD to LcD, and does not perform any signal transmission during the signal phase time period.

In the sensors 15a to 15c, the inter-peak waveform levels La to Lc are detected from the idle phase waveforms LaT to LcT produced by charging the capacitors 26a to 26c. If the detected waveform levels correspond to the stored respective levels, the response signals are transmitted to the ECU 18 during the signal phase time periods. The ECU 18 recognizes each sensor by receiving the corresponding response.

The ECU 18 thus does not transmit any signals in the signal phases in controlling the initialization of the sensors 15a to 15c, and hence the ECU 18 can specify each sensor 15a to 15c by receiving the responses in the signal phases.

As a result, it is restricted that higher harmonics (noises) of frequencies corresponding to several times of the communications speed are generated, thus adversely affecting the AM radio frequency band. Further, no increased cost is necessitated to counter such noises. That is, the communications from the ECU to the sensors does not adversely affect the AM radio frequency band nor increase costs.

Third Embodiment

Figure 10:
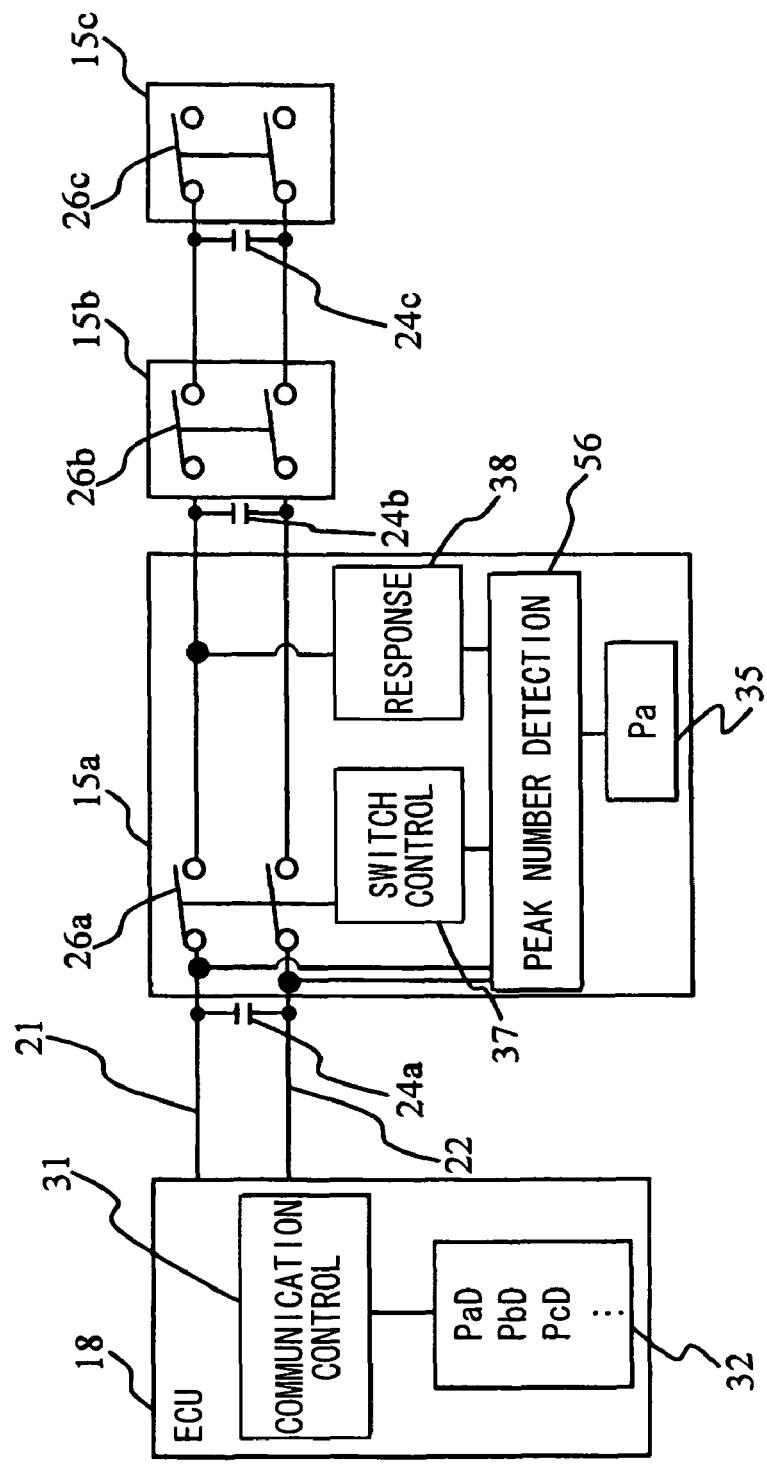
FIG. 10 is a block diagram showing a communications network of a passenger protection system according to a third embodiment of the present invention.

According to a third embodiment, as shown in FIG. 10, each sensor 15a to 15c includes a peak number detection circuit 56 as a parameter data detection circuit in place of the time period detection circuit 36 of the first embodiment and the inter-peak waveform level detection circuit 46 of the second embodiment. Further, the memory circuit 32 of the ECU 18 stores predetermined idle phase waveform generation data PaD to PcD in place of the time periods Ta to Tc of the first embodiment and the idle phase waveform generation data LaD to LcD of the second embodiment.

The idle phase waveform generation data PaD, PbD, PcD are provided to generate idle phase waveforms PaT, PbT, PcT for the sensors 15a, 15b, 15c as shown in FIGS. 11A, 11B, 11C, respectively. The idle phase waveforms PaT to PcT have different number of peaks (different peak numbers). The waveform PaT for the first sensor 15a has two peaks A1, A2, the waveform PbT for the second sensor 15b has three peaks B1, B2, B3, and the waveform PcT for the third sensor 15c has four peaks C1, C2, C3, C4.

The idle phase waveforms PaT to PcT are charge voltage waveforms of the capacitors 24a to 24c of the sensors 15a to 15c, respectively. Each capacitor 24a to 24c is effectively charged during the time period T in the last peak waveform A2 to C4 in each waveform cycle. Each idle phase waveforms PaT to PcT is shown in FIG. 12 in a simplified waveform having only one peak.

The communications control circuit 31 is configured to charge the capacitors 24a to 24c in accordance with the idle phase waveform generation data PaD to PcD stored in the memory circuit 32 so that the capacitors 24a to 24c generate the idle phase waveforms PaT to PcT, respectively, in the time sequence as shown in FIG. 12. The communications control circuit 31 transmits no signals during the signal phase time period between the two idle phase time periods, in each of which the idle phase waveform PaT to PcT is generated.

The memory circuits 35 of the sensors 15a to 15c store the predetermined number Pa (=2), Pb (=3), Pc (=4) of peaks (peak number) as parameter data and are different from one another, respectively.

The peak number detection circuit 56 is configured to detect, as the parameter detection circuit, the number of peaks peak Pa from the idle phase waveform PaT, which is developed when the capacitor 24a is charged. The peak number detection circuit 56 further checks whether the detected peak number corresponds to its stored peak number Pa, and outputs its check result to the switch control circuit 37 and the response circuit 38.

The switch control circuit 37 closes the switch 26a of the first sensor 15a to connect the second sensor 15b to the ECU 18, when the check result of the peak number detection circuit 56 indicates that the detected peak number corresponds to the stored peak number Pa. The switch control circuit 37 does not close the switch 26a, when the check result indicates no correspondence.

When the check result of the peak number detection circuit 56 indicates that the detected peak number corresponds to the stored peak number Pa, the response circuit 38 transmits a first response to the ECU 18 as shown in FIG. 12. This first response is transmitted in the signal phase period (time t4 to time t5), which follows the idle phase time period (time t3 to time t4) subsequent to the check operation (time t2 to time t3). The first response indicates that the peak number Pa for the first sensor 15a has been received.

The communications control circuit 31 of the ECU 18 thus recognizes the completion of initialization of the first sensor 15a by receiving the first response.

The initialization of the sensors 15a to 15c is performed in the communications network of the passenger protection system in the following manner, when electric power is supplied in the vehicle 10.

When the power supply is started in the vehicle 10, the communications control circuit 31 of the ECU 18 controls the first sensor 15a to charge the capacitor 24a by the idle phase waveform generation data PaD stored in the memory circuit 32. That is, the capacitor 24a is charged during the idle phase time period from time t1 to time t2 shown in FIG. 12 in the waveform having two peaks A1, A2 as FIG. 11A.

In the first sensor 15a, in the signal phase time period (time t2 to time t3), the peak number detection circuit 36 detects the peak number from the idle phase waveform PaT produced when the capacitor 24a is charged. The peak number detection circuit 36 further checks whether the detected peak number corresponds to the predetermined peak number Pa stored in the memory circuit 35. If the check result indicates that both peak numbers correspond to each other, this check result is applied to the switch control circuit 37 and the response circuit 38.

The switch control circuit 37 responsively closes the switch 26a thereby to connect the second sensor 15b to the ECU 18. The response circuit 38 transmits to the ECU 18 the first response, which indicates that the peak number Pa for the first sensor 15a has been received. This first response is transmitted in the signal phase time period, that is, from time t4 to time t5, which follows the idle phase time period (time t3 to time t4) and is subsequent to the preceding signal phase period (time t2 to time t3). The communications control circuit 31 of the ECU 18 recognizes the completion of initialization of the sensor 15a upon receiving the first response.

In the similar manner, in the second sensor 15b, the peak number Pb produced in the idle phase time period from time t3 to time t4 is detected and the switch 26b is closed to connect the third sensor 15c to the ECU 18. In the signal phase time period from time t6 to time t7, the second response is transmitted from the second sensor 15b to the ECU 18. Further, in the third sensor 15b, the peak number Pc is detected, and the switch 26c is closed. The third sensor 15c is connected to the ECU 18 and the capacitor 24c is charged in accordance with the idle phase waveform generation data PcD stored in the memory circuit 32 of the ECU 18. In the signal phase time period from time t8 to time t9, the third response is transmitted from the third sensor 15c to the ECU 18 if the peak number detection circuit 56 detects that the detected peak number corresponds to the peak number Pc stored in the sensor 15c. The communications control circuit 31 of the ECU 18 recognizes the completion of initialization of the sensors 15b and 15c upon receiving the second and third responses, respectively.

The sensors 15a to 15c may be connected in series without the switches 26a to 26c and the switch control circuits 37.

According to the third embodiment described above, the sensors 15a to 15c are provided with respective peak numbers Pa to Pc as the parameter data, which are different from one another. The ECU 18 performs the capacitor charge control for the capacitors 26a to 26c in accordance with the idle phase waveform generation data PaD to PcD, and does not perform any signal transmission during the signal phase time period.

In the sensors 15a to 15c, the peak numbers are detected from the idle phase waveforms PaT to PcT produced by charging the capacitors 26a to 26c. If the detected peak numbers correspond to the stored respective peak numbers, the response signals are transmitted to the ECU 18 during the signal phase time periods. The ECU 18 recognizes each sensor 15a to 15c by receiving the corresponding response.

The ECU 18 thus does not transmit any signals in the signal phases in controlling the initialization of the sensors 15a to 15c, and hence the ECU 18 can specify each sensor 15a to 15c by receiving the responses in the signal phases.

As a result, it is restricted that higher harmonics (noises) of frequencies corresponding to several times of the communications speed are generated, thus adversely affecting the AM radio frequency band. Further, no increased cost is necessitated to counter such noises. That is, the communications from the ECU 18 to the sensors 15a to 15c does not adversely affect the AM radio frequency band nor increase costs.

Other Embodiments

Figure 13:
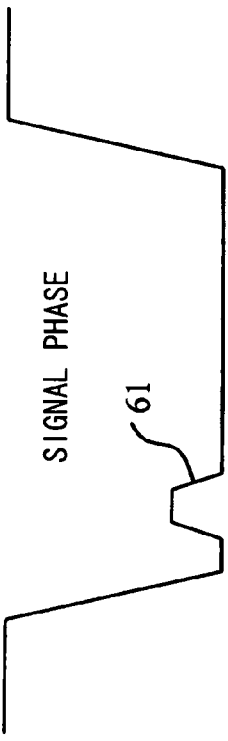
FIG. 13 is a waveform diagram showing a synchronization signal transmitted from an ECU to each sensor in a communications network of a passenger protection system according to a modified embodiment of the present invention.

In the foregoing embodiments, the ECU 18, specifically the communications control circuit 31, may be configured to generate a pulse-shaped synchronization signal 61 in the signal phase time period as shown in FIG. 13, and each sensor 15a to 15c may be configured to include a synchronization control circuit, which detects the synchronization signal 61 and synchronize its operation to the synchronization signal 61.

This configuration ensures synchronization of communications between the ECU 18 and the sensors 15a to 15c.

Figure 14:
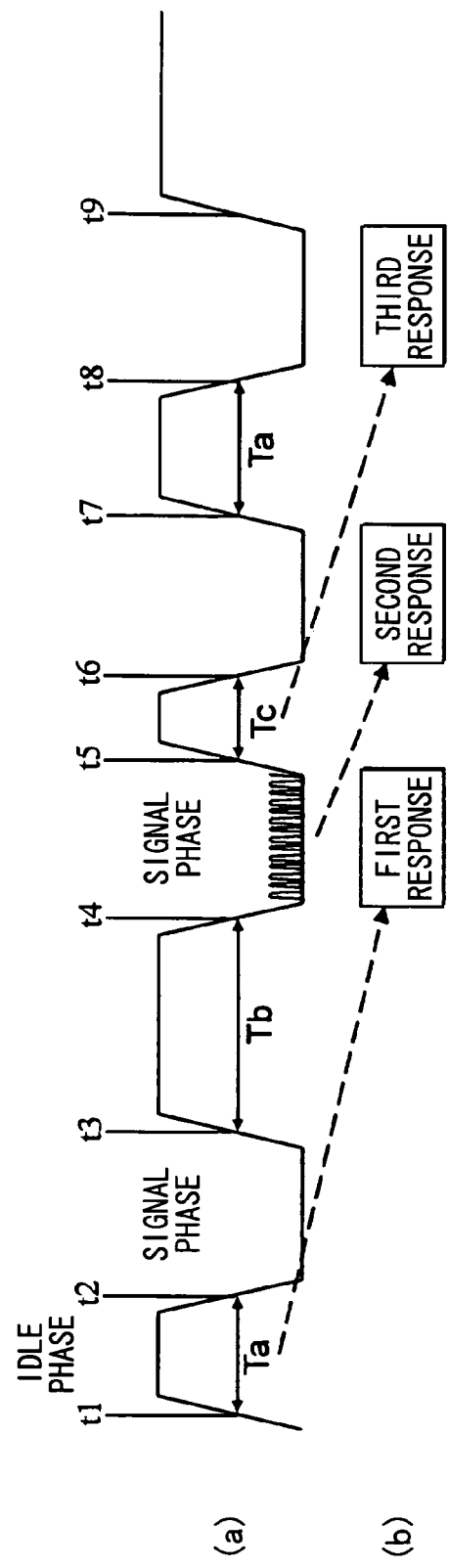
FIG. 14 is a timing diagram showing commands transmitted from an ECU to a plurality of sensors and responses to the commands from the sensors according to a modified embodiment of the present invention.

In the foregoing embodiments, the ECU 18, specifically the communications control circuit 31, may be configured to transmit a predetermined command in one of the signal phase time periods, for example, from time t4 to time t5, as shown in (a) of FIG. 14. The predetermined command may be for resetting each sensor 15a to 15c, diagnosing each sensor 15a to 15c, and the like. Each sensor 15a to 15c, specifically the response circuit 38; may be configured to detect the command and performs operation corresponding to the command with priority in the next signal phase time period, that is, time t6 to time t7.

This configuration ensures that each sensor 15a to 15c performs the operation of the transmitted command with priority.

What is claimed is:

1. A communications network of a passenger protection system having a passenger protection device, which protects passengers at time of vehicle collision, the communications network comprising:
    a plurality of sensors including respective capacitors, which are electrically chargeable; and
    an electronic control unit configured to control the passenger protection device and bus-connected to the sensors to control charging of the capacitors so that the sensors respond by electric charge of the capacitors, the electronic control unit configured to control initialization of the sensors by controlling a state, in which an idle phase time period for charging the capacitors and a signal phase time period for receiving responses of the sensors are alternately repeated,
    the electronic control unit including a first memory circuit for storing a plurality of waveform generation data provided in correspondence to the sensors differently one another so that the capacitors produce different idle phase waveforms corresponding to the stored waveform generation data, and a communications control circuit for controlling respective charging of the sensors in the idle phase time period in accordance with the stored waveform generation data, and
    each of the sensors including a second memory circuit for storing a parameter data corresponding to the stored waveform generation data provided thereto, a detection circuit for detecting a parameter data of the idle phase waveform of the capacitor, and a response circuit for responding to the electronic control unit in the signal phase time period when the detected parameter data of the idle phase waveform corresponds to the stored parameter data of the idle phase waveform.

2. The communications network according to claim 1, wherein:
    the first memory circuit stores, as the waveform generation data, a time period for charging the capacitor to produce the idle phase waveform, the time period being different from sensor to sensor; and
    the second memory circuit stores, as the parameter data, a time period of the idle phase waveform of a corresponding capacitor of the sensor.

3. The communications network according to claim 1, wherein:
    the first memory circuit stores, as the waveform generation data, an idle phase waveform data of a waveform having two peaks and an inter-peak waveform level between the two peaks, the inter-peak waveform level being different from sensor to sensor; and
    the second memory circuit stores, as the parameter data, an inter-peak waveform level between two peaks of the idle phase waveform of a corresponding capacitor of the sensor.

4. The communications network according to claim 1, wherein:
    the first memory circuit stores, as the waveform generation data, an idle phase waveform data of a waveform having a plurality of number of peaks, the number of peaks being different from sensor to sensor; and
    the second memory circuit stores, as the parameter data, a number of peaks of the idle phase waveform of a corresponding capacitor of the sensor.

5. The communications network according to claim 1, wherein:
    the communications control circuit is configured to control generation of a synchronization signal in the signal phase time period; and
    each of the sensors is configured to synchronize an operation thereof with that of the electronic control unit in response to the synchronization signal.

6. The communications network according to claim 1, wherein:
    the communications control circuit is configured to control transmission of a command, which causes the sensors to perform predetermined processing, in the signal phase time period; and
    the response circuit is configured to perform the predetermined processing corresponding to the command with priority in response to the command in the signal phase time period.

7. The communications network according to claim 1, wherein:
    the communications control circuit is configured to stop any transmission therefrom in the signal phase period.

* * * * *